UNITED STATES PATENT OFFICE.

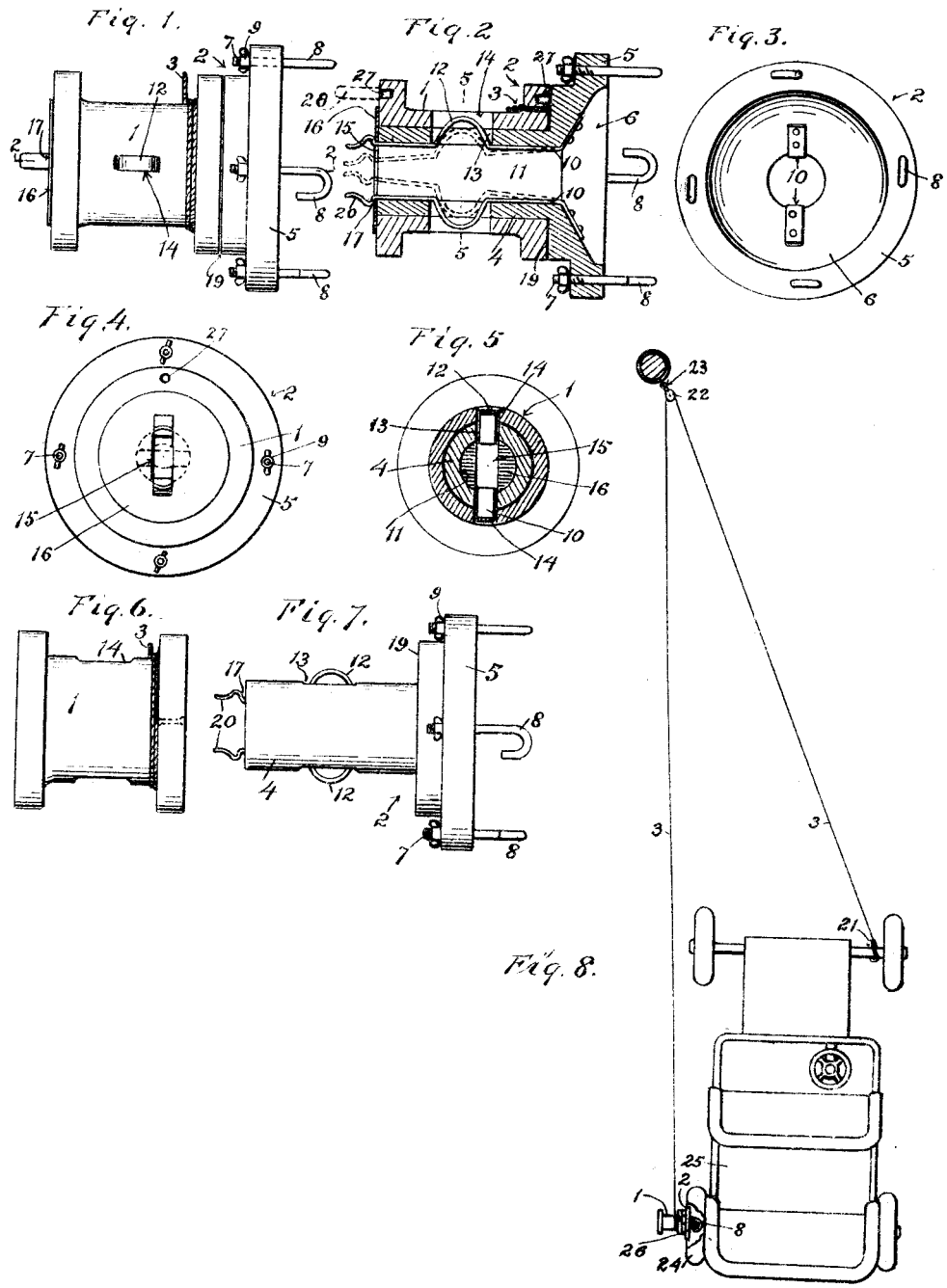

FRANCIS SIMMONS, OF GARDENA, CALIFORNIA.

SELF-PULLING ATTACHMENT FOR MOTOR-CARS.

1,197,072.  Specification of Letters Patent.  Patented Sept. 5, 1916.

Application filed September 15, 1915. Serial No. 50,721.

*To all whom it may concern:*

Be it known that I, FRANCIS SIMMONS, a citizen of the United States, residing at Gardena, in the county of Los Angeles and State of California, have invented a new and useful Self-Pulling Attachment for Motor-Cars, of which the following is a specification.

This invention relates to means for pulling an automobile or other motor car out of a position in which it has become stalled, by reason of sandy, muddy, or other condition of the road, resulting in loss of tractive effect of the driving wheels on the road, so that said wheels turn without driving the car forward.

The main object of the present invention is to provide an attachment for motor cars whereby the car may haul itself out of such a position by its own power.

A further object of the invention is to provide a pulling attachment which can be readily attached to a driving wheel at either side of the car.

Another object of the invention is to provide a pulling attachment provided with a hauling cable, mounted in such manner that the cable can be readily wound on, or unwound from, the hauling drum.

The accompanying drawings illustrate my invention, and referring thereto:

Figure 1 is a plan view of the attachment. Fig. 2 is a section on line 2—2 in Fig. 1. Fig. 3 is a rear elevation of the attachment. Fig. 4 is a front elevation thereof. Fig. 5 is a section on line 5—5 in Fig. 2. Fig. 6 is a side elevation of the winding drum. Fig. 7 is a side elevation of the coupling device whereby the winding drum is detachably mounted on a wheel of the motor car. Fig. 8 is a plan view showing the manner in which the attachment is used in pulling an automobile.

The invention comprises a winding drum 1, a coupling device 2 whereby said drum is attachable to a driving wheel of a motor car, and a cable or flexible hauling means 3 attached to said drum and provided with means for attachment to a fixed object, to serve as a support for the hauling means.

Drum 1 is preferably mounted on the coupling device 2 in such manner as to permit of free relative rotation of the drum on said device, when desired. For this purpose the coupling means 2 is formed with a cylindrical portion 4 serving as a bearing, on which the drum 1 is rotatably mounted. A head or flange 5 is provided at one end of this bearing and is recessed as shown at 6 so as to fit over the hub of a motor car wheel, and suitable clamping devices are provided on this head portion for attaching the coupling member to the car wheel. Said clamping devices may consist of screws 7 provided with hooks 8 adapted to fit or extend around the spokes of the wheel, and with nuts 9 whereby they may be drawn into tight engagement with the spokes, at the same time drawing the member 5 into tight engagement with the spokes or with a portion of the hub of the wheel. The drum 1 is normally clutched to the member 2 so as to rotate therewith, by means of clutch means formed for example as leaf springs 10, each attached at one end to the member 2 and extending in an axial bore 11 in said member, and provided with a bend or projection 12 extending through a slot 13 in the member 2 and adapted to extend into a slot 14 in drum 1. Said springs 10 extend through the bore 11 to the front end of the attachment and through a slot 15 in a disk or plate 16 and are provided at their front ends with outwardly extending shoulders 17 adapted to engage with the outer face of said plate, so as to hold said plate in position against the front end of the drum and thereby provide an outer end bearing for the drum, the drum bearing thus mounted between said plate 16 and a shoulder 19 on the member 2. Said springs 10 are further provided with forward extensions 20 which are convergent so as to facilitate slipping of the disk 16 into position back of the shoulders 17, these extensions also serving as means whereby the springs 10 may be manually operated, to press them inwardly to releasing position when desired.

The cable or flexible hauling means 3 is attached at one end to the drum 1 and may be provided at its other end with means such as a hook 21 for attachment either to a suitable support, or to the vehicle itself. A sheave or pulley block 22 may also be provided on the cable, said cable being passed over said pulley and the block being provided with suitable means 23 for attachment to a support.

The device is used as follows: The coupling member 2 is placed over the hub of one of the driving wheels 24 of the motor car 25 and attached to said wheel by engagement of the hooks 8 with the spokes 26 thereof, as indicated in Fig. 8, care being taken that the position of the drum is such that the cable 3 winds on or leads from the bottom of the drum. To insure this the drum is made reversible on its support and coupling member 2, it being obvious that by pressing the springs 10 together, the drum may be released so that it may be withdrawn from the bearing 4 and then placed on the bearing reversed end for end, the disk 16 being then slipped over the springs 10 so as to engage back of the shoulders 17 and hold the drum in position. The attaching means 23 at the outer end of the cable may then be attached to a suitable support along the roadway, such as a tree, rock, etc., or if desired, said outer end of the cable may be attached by said means 23 to the front axle of the car, as shown in Fig. 8, the pulley block 22 being in that case secured to said support as indicated at 23. The motor of the car being then set in motion, drives the wheel 24, so as to rotate the coupling member 2 and the drum 1, and wind the cable on the drum, with the result that the car is drawn forward by a positive pull, the effectiveness of the pull being increased by the leverage effect due to the small diameter of the drum 1 as compared with the diameter of the car wheels. As soon as the car has been pulled forward as far as desired, or as far as is possible, the clutch means 10 may be again released from the drum and may be held in released position by turning disk 16 to position shown in dotted lines in Figs. 2 and 4 and by inserting a suitable handle, indicated in dotted lines at 28 in Fig. 2, in a socket 27 in member 1, the drum 1 may be turned to wind the cable thereon. In case the car is to be pulled back to get it out of a stalled position, the hauling cable is attached to suitable supporting means at the rear of the car, the engine being reversed.

What I claim is:

1. A self pulling attachment for motor cars comprising a coupling member provided with means for attachment to a wheel of a car, a drum reversibly mounted on said coupling member and having slots, and spring means mounted on said coupling member and provided with portions extending into said slots for releasably connecting the drum to the coupling member to rotate therewith, said drum being adapted to have a cable wound on the same.

2. A self-pulling attachment for motor cars comprising a coupling member provided with means for attachment to a wheel of the car and with a bearing having slots, a drum rotatably mounted on said bearing and reversible thereon, said drum having slots, and springs extending within said bearing and having portions extending through said slots in said bearing and in said drum to releasably connect the drum to the bearing, and said springs having portions extending beyond the bearing and provided with shoulders and with manual operating means engaged by said shoulders to hold the drum on the bearing, said drum being adapted to have a cable wound on the same.

3. A self-pulling attachment for motor cars comprising a coupling member provided with a bearing, a drum rotatably mounted on said bearing, spring means for releasably connecting said drum to the bearing, said spring means being provided with manual operating means, means for engaging said spring means to hold the same out of engagement with the drum to permit of rotation of the drum on the bearing, means on said coupling member for engaging a wheel of the car for rotation of the drum by the car wheel when the drum is connected to the bearing, and handle means for operating the drum manually when it is disconnected from the bearing, said drum being adapted to have a cable wound on the same.

In testimony whereof I have hereunto set my hand, at Los Angeles, California, this 8th day of September 1915.

FRANCIS SIMMONS.